United States Patent [19]
Hudecek

[11] Patent Number: 5,453,012
[45] Date of Patent: Sep. 26, 1995

[54] BRAILLE DISPLAY

[75] Inventor: Milan Hudecek, Melbourne, Australia

[73] Assignee: Robotron Pty Ltd, Melbourne, Australia

[21] Appl. No.: 128,347

[22] Filed: Sep. 28, 1993

[30] Foreign Application Priority Data

Sep. 30, 1992 [AU] Australia ............... PL5037

[51] Int. Cl.⁶ ............................................. G09B 21/00
[52] U.S. Cl. .............................................. 434/114
[58] Field of Search ........................... 434/112, 113, 434/114

[56] References Cited

U.S. PATENT DOCUMENTS 4,871,992  10/1989  Petersen ..................... 434/114 X

FOREIGN PATENT DOCUMENTS 1756920  8/1992  U.S.S.R. ..................... 434/114
2153576  8/1985  United Kingdom ........... 434/114

Primary Examiner—Robert P. Swiatek
Attorney, Agent, or Firm—Thomas M. Freiburger

[57] ABSTRACT

A Braille display for denoting characters by the positions of six or eight movable projections or pins (10, 11, 12) arranged in two parallel columns. Each projection is movable between an elevated position and a lowered position by a rotary cam actuator (30) so that different rotary positions of the cam members (31) cause the projections to adopt different predetermined permutations of the elevated and lowered positions of the projections corresponding to respective characters to be denoted by the Braille display. There is one cam member (31) for each column of projections. Drive elements in the form of stepping motors (35) selectively rotate the cam members (31) between their different rotary positions. Each pin (10, 11, 12) preferentially adopts its lowered position, e.g. by action of biasing springs (20, 21, 22). Each pin has a head (33) in contact with the associated cam member (31), and each cam member has depressions (32) in its profile so that each head can enter a respective depression to effect movement of the respective pin from its elevated to its lowered position. The cam profiles (32) are shaped to ensure that only one projection (10, 11, 12) is ever being moved by the cam profiles at any instant.

8 Claims, 1 Drawing Sheet

BRAILLE DISPLAY

FIELD OF INVENTION

This invention relates to tactile Braille displays.

BACKGROUND OF THE INVENTION

A tactile Braille display comprises an array of six pins with three equally spaced pins in each of two parallel columns. Each pin is selectively movable between an elevated position and a lowered position so that there are 64 permutations of possible positions for the six pins. The display can be touched by a blind or visually impaired person and a character, such as a numeral or letter, can be indicated by the positions of the pins similar to the traditional Braille display comprising punched card or other relief patterns.

It is difficult to provide a practical electrically driven tactile Braille display since the requirements include small size and low power. Such displays can use piezoelectric or electromagnetic actuators for the pins. One disadvantage of the piezoelectric actuators is the continuous power consumption needed to maintain the pins in either one of the elevated or lowered positions, even if the display is not being read but is to be maintained for later reading by the user.

It is an object of the present invention to provide an improved Braille display which enables electrically controlled movement of the pins and enables low power consumption to be achieved.

SUMMARY OF THE INVENTION

According to the present invention there is provided a Braille display for denoting characters by the positions of six movable projections arranged in two parallel columns with each column comprising three of said projections, each projection being movable between an elevated position and a lowered position, actuator means for selectively moving each of the projections between its said two positions, the actuator means comprising rotary means having different rotary positions, the rotary means being operatively coupled to the projections so as to effect movements of the said projections, the rotary means in said different rotary positions causing said projections to adopt different predetermined permutations of the elevated and lowered positions of the projections corresponding to respective characters to be denoted by the Braille display, the actuator means further including drive means for selectively rotating the rotary means between its different rotary positions.

BRIEF DESCRIPTION OF THE DRAWINGS

A preferred embodiment of the present invention will now be described with particular reference to the accompanying drawings, in which.

DETAILED DESCRIPTION

Figure 1:
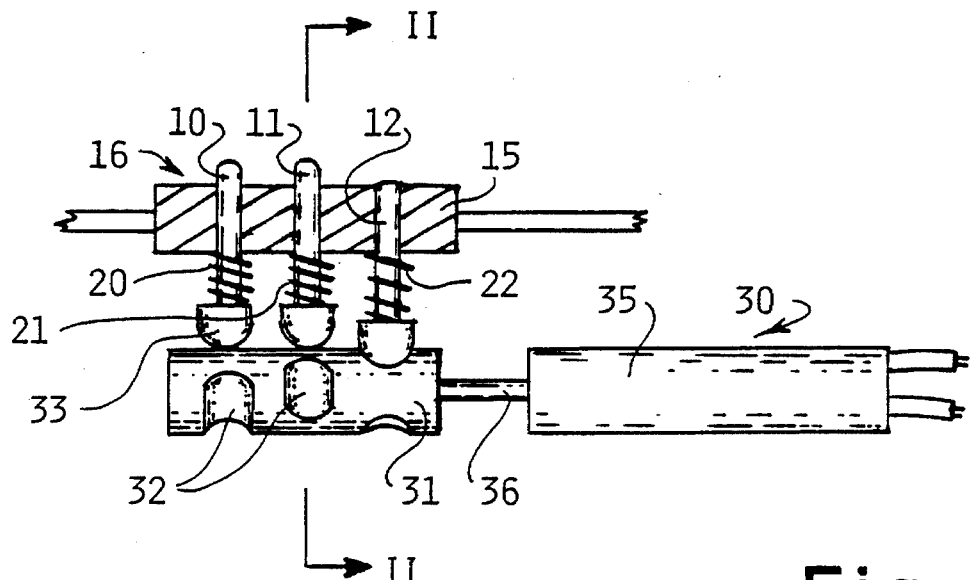
FIG. 1 is a vertical sectional view through a magnified Braille display cell embodying the present invention.

In the drawings, the Braille cell 16 comprises six projections in the form of pins, three of which are indicated in FIG. 1 by the numerals 10, 11, 12. Pins 10, 11 are shown in their elevated positions and pin 12 is shown in its lowered position. The pins 10, 11, 12 are spaced apart, e.g. by 2.5 mm approximating the standard Braille pin separation. The pins 10, 11, 12 are movable vertically in a guide block 15 which has bores therethrough for slidably receiving the pins. A complete Braille cell 16, as shown in FIG. 3, comprises two columns each having three such pins 10, 11, 12, the columns being about 5mm apart.

Each of the pins 10, 11, 12 preferentially adopts its lowered position and therefore may have an associated biasing spring 20, 21, 22 which biases the respective pin towards its lowered position–see pin 12. However, the pins may be movable to their lowered positions under their own weight, enabling elimination of the biasing springs if desired.

Figure 2:
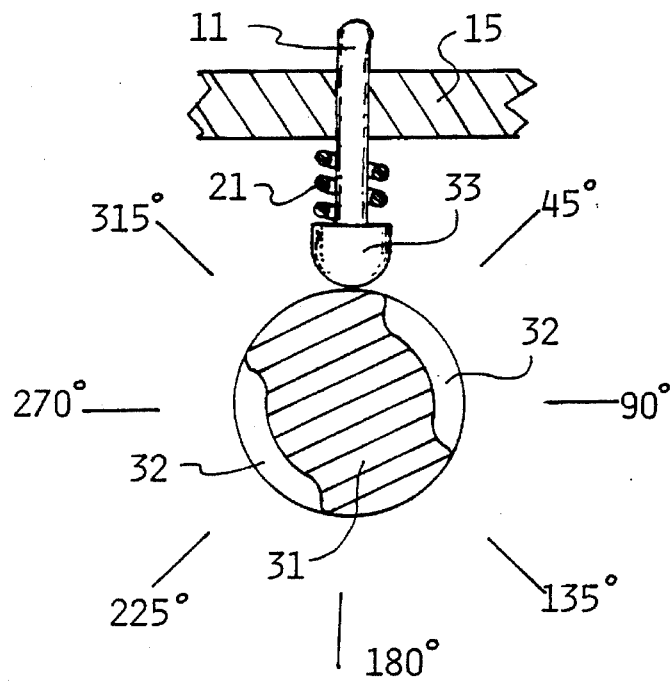
FIG. 2 is an sectional view along the line II—II in FIG. 1.

Actuator means 30 moves the pins 10, 11, 12 against the action of springs 20, 21, 22 to adopt their elevated positions (pins 10 and 11) and allows the pins to retract to their lowered positions under the action of the associated springs (pin 12). The actuator means 30 comprises a rotary means, shown as cam means 31, in the form of two similar cylinders having depressions 32 at predetermined positions around the circumference of the cylinder and in registry with respective heads 33 of the pins. Each cylinder 31 actuates a column of three pins. As best seen in FIG. 2 rotation of the cylinder 31 allows the head 33 to enter the depressions 32 under the action of the associated biasing spring 21 or, alternatively, the head 33 can lift out of the depressions 32 as the cylinder rotates to thereby move the respective associated pin 11 to its elevated positions as shown.

Figure 3:
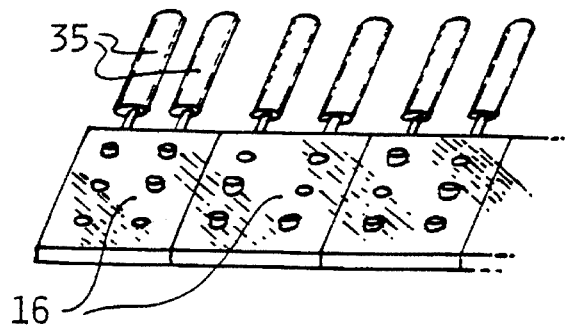
FIG. 3 is a schematic perspective view of an elongated Braille display comprising numerous individual six pin Braille display cells according to the present invention.

In FIGS. 1 and 3, the cylinder 31 is driven by a motor 35, such as a small stepping motor, through shaft 36 between eight possible rotary positions corresponding to rotational increments of 45°. By providing eight rotary positions, eight different permutations of positions of the three pins 10, 11, 12 can be provided by a suitable arrangement of the depressions 32. Thus by providing two motors 35 per Braille cell as shown in FIG. 3, all sixty four possible permutations of the positions of the six pins in the Braille cell 16 can be provided by selective independent rotation of the two cam cylinders 31 in 45° increments.

In an alternative construction of the cam means to the cylinder illustrated, the cam means may comprise three cam sections mounted co-axially on the motor shaft 36, each cam section being associated with a respective one of the pins and having a predetermined profile to move the respective pin as desired. In both the illustrated embodiment having a cam cylinder 31, and the alternative possibility of three cam sections mounted co-axially, the location and configuration of the cam profiles can be designed to ensure that as the motor is rotating the cam means between its rotary positions, only one pin is ever being moved at any instant. That is, during any incremental rotary movement through 45°, even if two or three pins are to be moved between their respective positions, at any one instant, only one pin is being moved, but by the time the 45° movement has finished, all the pins desired to be moved have been moved. This helps to distribute the torque loading on each motor by ensuring that a peak torque loading caused by attempted movement of two or three pins simultaneously is avoided.

It will be seen that, in the illustrated arrangement described above, two small stepping motors 35 can be used to control a Braille cell of six pins and enable the cell to indicate characters for reading by a blind or visually impaired person.

The eight rotary positions of the cam means corresponding to eight permutations of positions of the three associated pins can be held without continuous supply of power. In particular, the cam means 31 has eight discrete stable rotational positions so that the pin positions are maintained even if power to the display is disconnected.

It will be seen that the preferred embodiment as described and illustrated can provide an effective, relatively simple, low powered Braille display.

Sometimes a Braille display has two additional pins, making eight pins in a four by two array. In this case, the cam cylinder would have sixteen rotary positions at 22.5° angular increments and the eight pins provide a possible character set of 128 characters. The present invention is not limited to the six-pin Braille display but is also applicable to such an eight-pin display.

What I claim is:

1. A Braille display for denoting characters by the positions of at least six movable projections arranged in two parallel columns with each column comprising at least three of said projections, each projection being movable between an elevated position and a lowered position, actuator means for selectively moving each of the projections between its said two positions, the actuator means comprising rotary means having different rotary positions, the rotary means being operatively coupled to the projections to as to effect movements of the said projections, the rotary means in said different rotary positions causing said projections to adopt different predetermined permutations of the elevated and lowered positions of the projections corresponding to respective characters to be denoted by the Braille display, the actuator means further including drive means for selectively rotating the rotary means between its different rotary positions, and wherein the rotary means comprises two cam members having cam profiles, each cam member being associated with a respective column of said projections so that rotation of each cam member effects movements of the associated projections between their elevated and lowered positions depending on the rotary position of the cam member, each cam member having an associated drive means for moving the cam member between its rotary positions.

2. A Braille display as claimed in claim 1 wherein each projection comprises a pin movable in associated guide means between its elevated position an its lowered position, each pin preferentially adopting its lowered position, each pin having a head in contact with the associated cam member, each cam member having depressions in its profile at predetermined positions around the profile of the cam member, each of the depressions being located so as to register with the head of a respective pin, whereby each head can enter the respective depression to effect movement of the respective pin from its elevated to its lowered position.

3. A Braille display as claimed in claim 2 and further including biasing means associated with each projection and operative to bias the respective projection towards its lowered position, whereby the cam members move each of the projections against the action of the associated biasing means in moving the projection from its lowered position to its elevated position.

4. A Braille display as claimed in claim 1 wherein the drive means for the cam member comprises a stepping motor having a shaft coupled to the respective cam member, the motor having eight rotary positions arranged at angular increments of 45° about the axis of rotation of the shaft, whereby the eight rotary positions of the cam member provide eight different permutations of the positions of the [three] associated projections.

5. A Braille display as claimed in claim 1, 2 or 4 wherein the cam profiles are shaped to ensure that as each drive means is rotating the respective cam member between its rotary positions, only one projection is ever being moved by the cam profiles at any instant.

6. A Braille display as claimed in claim 1 having six movable projections arranged in two parallel columns with each said column comprising three of said projections.

7. A Braille display as claimed in claim 6 and further including two additional projections, each of the two additional projections being located in a respective one of the two columns of projections, the actuator means having rotary positions corresponding to different permutations of possible positions of the eight projections.

8. A Braille display as claimed in claim 1 wherein each cam member comprises a plurality of cam sections, each cam section being operatively associated with a respective one of the projections.

\* \* \* \* \*